United States Patent [19]  [11]  4,141,339
Weinstein  [45]  Feb. 27, 1979

[54] SOLAR HEAT COLLECTOR

[75] Inventor: Albert Weinstein, Alexandria, Va.

[73] Assignee: Westinghouse Electric Corp., Pittsburgh, Pa.

[21] Appl. No.: 816,130

[22] Filed: Jul. 15, 1977

[51] Int. Cl.² .............................................. F24J 3/02
[52] U.S. Cl. ................................................. 126/270
[58] Field of Search .............................. 126/270, 271

[56] References Cited

U.S. PATENT DOCUMENTS

| 3,254,643 | 6/1966 | Thomason | 126/271 |
| 3,987,784 | 10/1976 | Godrick | 126/270 |
| 4,046,133 | 9/1977 | Cook | 126/270 |

FOREIGN PATENT DOCUMENTS

| 276788 | 11/1955 | Australia | 126/270 |
| 2546069 | 4/1977 | Fed. Rep. of Germany | 126/271 |
| 2309811 | 11/1976 | France | 126/271 |

Primary Examiner—John J. Vrablik
Attorney, Agent, or Firm—E. C. Arenz

[57] ABSTRACT

A relatively low cost and lightweight solar energy collector of the type in which air is used as the heat transfer medium is provided by a frame member having the general form of an upwardly open box formed of relatively low density rigid thermal insulating slabs, a solar insulation absorber plate within the box, and a transparent glazing cover for closing the top open side of the box, with the edges of the frame member being secured to and sealed with the glazing cover by a high temperature adhesive and sealant which has the property of flexibility in maintaining its sealing and bonding character throughout the variations in temperature to which the solar collector is subjected to thereby accommodate the differential expansion of the box relative to the cover. The box has a width which permits it to nest between the framing members of the structure to which it is to be applied, and the cover has a slightly greater width so that it is supported by the exterior faces of the framing member and accordingly is integrated into the building structure to provide an exterior surface of the building in the area of the collector.

6 Claims, 4 Drawing Figures

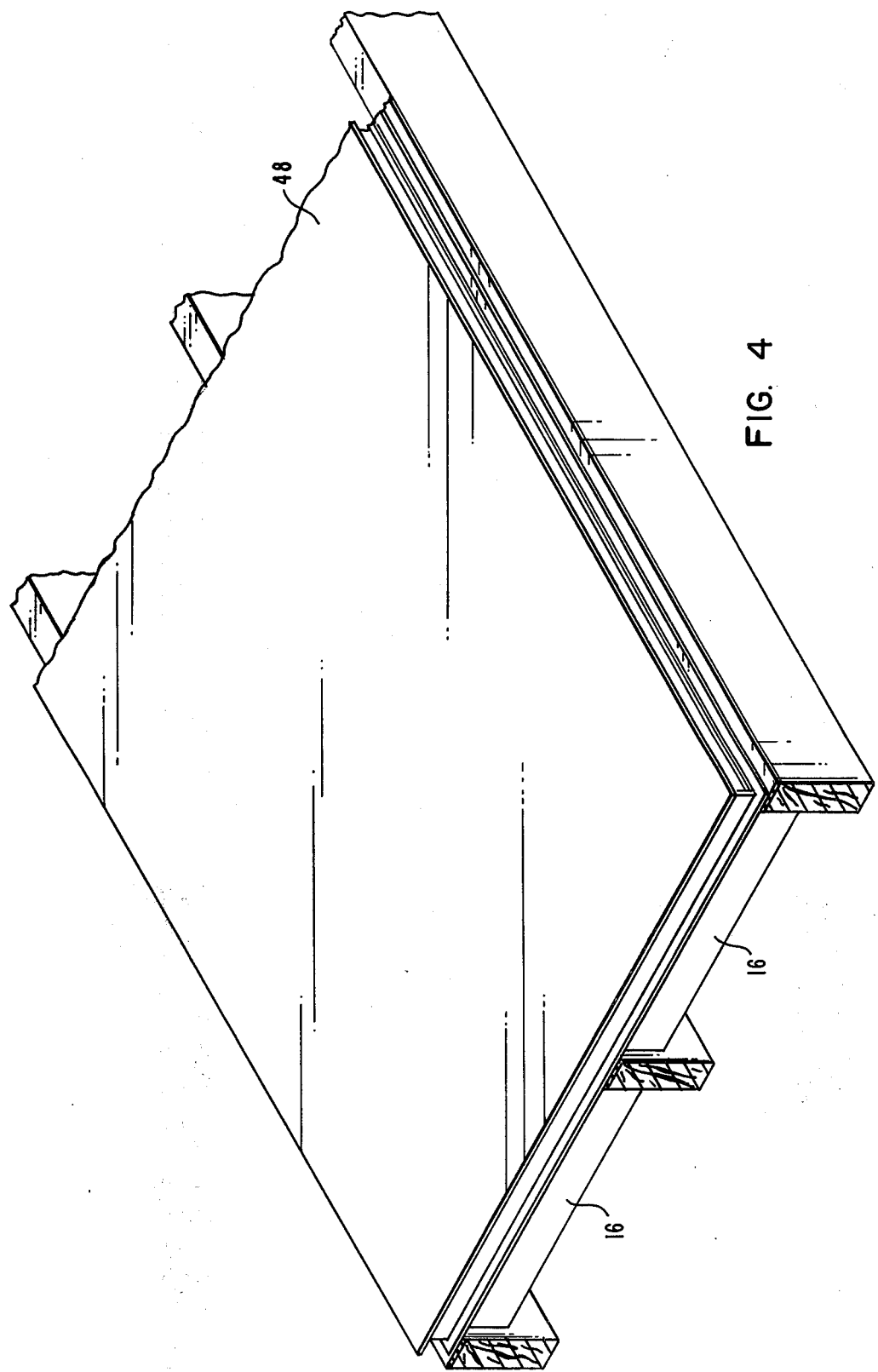

SOLAR HEAT COLLECTOR

BACKGROUND OF THE INVENTION

1. Field of the Invention

The invention pertains to the art of solar energy collectors of the type in which air is used as the heat transfer medium to carry heat from the collector to its location of use.

2. Description of the Prior Art

Those conversant with the art of solar collectors as it currently exists are aware that many different arrangements of solar collector modules of the air type have been manufactured and marketed with the basic elements including, as in the case of the present invention, an absorber, heat exchanger surface for transferring the solar heat to the air to be heated, a transparent glass or plastic cover to permit the solar insolation to be absorbed by the plate and reduce heat loss back away from the absorber, a box or frame containing the absorber and connected to the covers and cooperating with the absorber plate to provide a passage for the flow of air through the box, and thermal insulation for limiting heat losses from the box. While typically the currently available collector modules are normally installed exteriorly of a finished exterior surface, such as a roof, of a building it is known to integrate some of the collector modules into the building structure to form a part thereof.

The typical commercial collectors available include a box or frame of metal construction such as extruded aluminum or rolled steel and the assembly of the component parts of the collector with the box involves gaskets, hole drilling, and fastening with bolts and nuts or screws. The metal frame is expensive, adds considerable weight, and the assembly process including the fastening incurs substantial labor costs. A typical glass covered collector of the type of construction described and having nominal dimensions of about 2 feet × 8 feet will weigh in the neighborhood of 100 lbs. or more. As a result, such heavy collectors are not only relatively expensive to make, but are also more expensive to ship, and considerably more difficult to handle in installation.

The aim of my invention is to provide a relatively lightweight, materially lower cost and easier to handle solar collector which is also adapted to be integrated into the building structure to form a part thereof.

SUMMARY OF THE INVENTION

In accordance with my invention, the use of a metal frame in conjunction with the air box is avoided by forming a frame member from a relatively low density rigid thermal insulating material, and securing the upper edges of the upwardly open box to a glazing cover, with an adhesive-sealant which has the property of flexibility in maintaining its sealing and bonding character throughout the variations in temperature to which the solar collector is subjected, thereby accommodating the differential expansion of the box relative to the cover without losing either the securing or sealing effect, or resulting in warping of the cover. Preferably the cover comprises an integral unit of a pair of spaced apart fiberglass reinforced plastic sheets in a sandwich arrangement with a sealed interior air space. The box contains an absorber plate which, with the bottom of the box, defines the passage through which the air to be heated flows.

In a sense then, the approach to my invention may be viewed in one aspect as a lightweight, flexibility approach in that the box and cover are yieldable relative to each other to accommodate the forces arising from differential expansion, in contrast to the approach of the prior art devices which, in my view, are a heavyweight, overly strong rigid approach to the device.

DRAWING DESCRIPTION

FIG. 4 is a fragmentary isometric view of a double size panel arrangement.

DESCRIPTION OF THE PREFERRED EMBODIMENT

Figure 1:
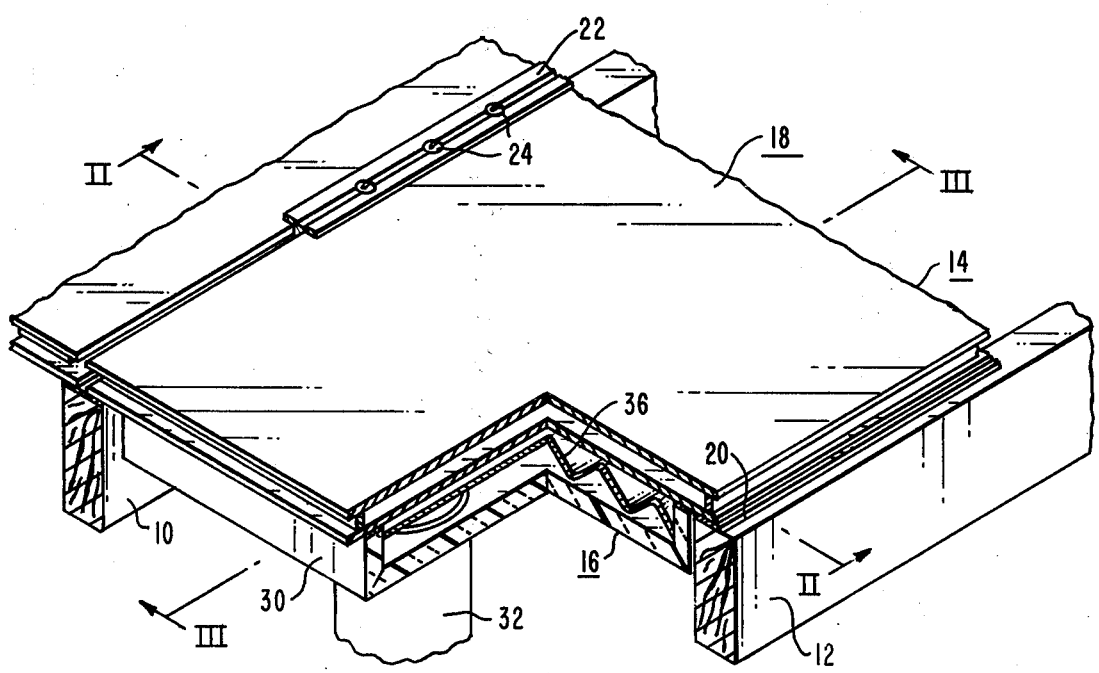
FIG. 1 is a partly broken isometric view of collectors according to my invention in their installed position integrated with the building structure.

In FIG. 1, a part of a building structure which is to form an exterior surface area of the building with an orientation to receive solar insolation is illustrated as comprised of two framing members, such as rafters 10 and 12 for a roof spaced apart a given distance such as 2 feet (0.609 meters) center-to-center. The solar collector module of the invention generally designated 14 has its frame or air box portion 16 nested between the rafters with its cover assembly 18 supported by the rafters. In installing the collector, glazing tape such as closed cell vinyl foam tape 20, which essentially functions as a weatherproofing gasket to accommodate irregularities of contour of the upper edges of the rafter, is interposed between the bottom marginal edges of the cover assembly and the upwardly facing edges of the rafters. To securely fasten the collectors to the rafters, battens 22 may be used along with fasteners 24 along at least the side edges of the collector. To the extent necessary caulking may be used to promote a watertight seal. In the typical installation, the collectors will be arranged in side-by-side relation and, depending upon the total quantity of heat required, may be stacked one above another in the direction of the lower edge of the roof toward the ridge. To the extent that conventional sheathing and shingles or other roof coverings are used on areas adjacent the collector area, conventional flashing and other water sealing means may be used at the junctures of the collectors with the other parts of the roof. It will be appreciated from the foregoing that where the solar collectors are installed, they, in themselves, have been integrated into the building structure to form exterior surfaces of the building and eliminate the usually required building elements of sheathing and roof covering.

Figure 2:
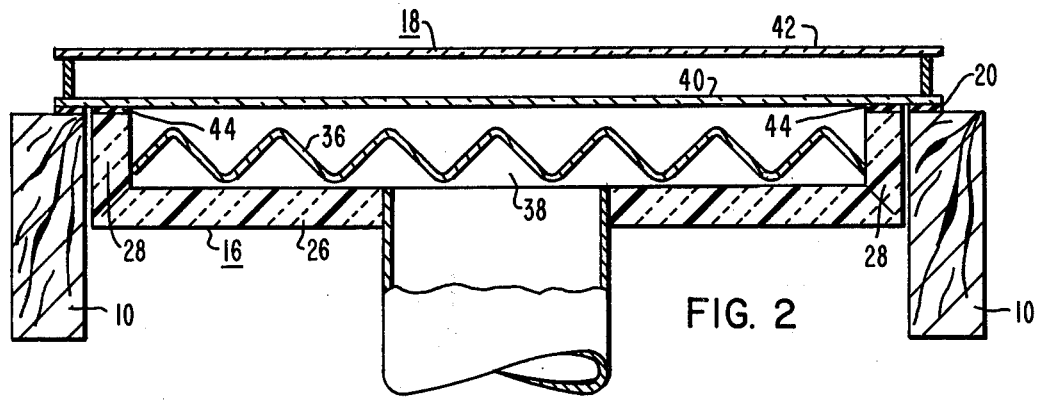
FIG. 2 is a sectional view of a collector according to the invention corresponding to one taken along the line II—II of FIG. 1.
Figure 3:
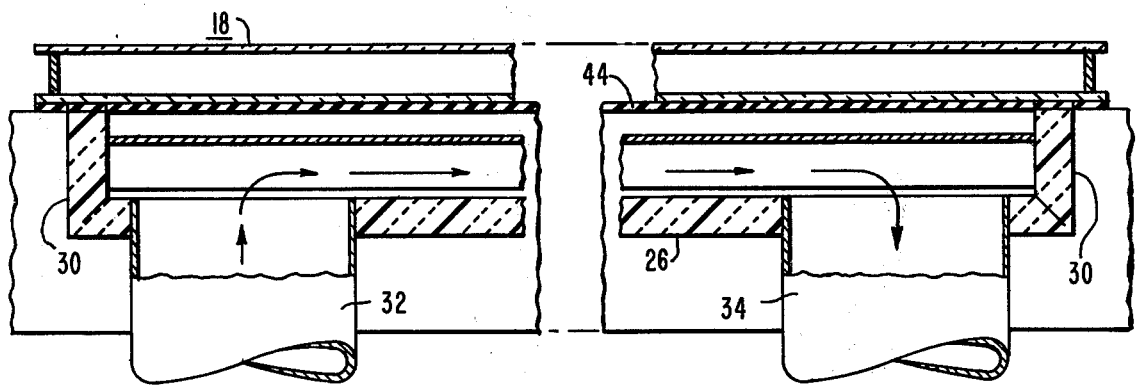
FIG. 3 is a sectional view of the collector corresponding to one taken along the line III—III of FIG. 1.

Turning now to a more detailed explanation of the construction of the collector in connection with FIGS. 2 and 3, the frame member or air box 16 has the general form of an upwardly open box including a bottom wall 26, opposite side walls 28 and opposite end walls 30. The material of which the box is formed is a stiff, fiberglass thermal insulating material known in the trade as "ductboard" and is commercially available from suppliers such as Owens Corning Fiberglass Corporation and Certainteed Corporation. This material may be purchased in flat slabs with a metal foil on one face thereof.

To fabricate the box from such material, the slab is grooved with angular or shiplap grooves of about 90° along the lines which are to form the bottom corners of the box. The grooves are cut from the foilless face of the board so that the metal foil remains intact and will be on the outside faces of the box when the side walls and end walls are bent up along the groove lines to form the rectangular box. Special machines for grooving the board are commercially available since this is a conventional way of processing "ductboard" to form air ducts for heating and air conditioning installations. An opening is provided in the bottom wall 26 near each end of the box to receive and have secured thereto the inlet and outlet ducts 32 and 34.

A metal plate 36, having its upper surface treated to promote solar insolation absorbtivity and decrease its emissivity is mounted in the air box and located to define with the bottom wall 26 and air flow passage therebetween extending from end-to-end of the collector. As illustrated, the plate preferably is generally corrugated in transverse cross section to increase the surface area of the plate relative to a generally flat plate.

The cover assembly 18 comprises one or more flat, transparent glazing elements which serve to transmit the solar radiation to the absorber plate and block the loss of heat back out of the box in an upward direction. In the currently preferred form of the invention, the cover sheets 40 and 42 are fiberglass reinforced plastic panels arranged in spaced apart sandwich relation with a sealed air core therebetween, such assemblies being commercially available from sources such as the Kalwall Corporation of Manchester, New Hampshire, the panels being identified as SUN-LITE by that company. The plastic panel covers are currently preferred because of their resistance to breakage from hail, and other solid objects such as rocks, and they are lighter and less costly than glass panels.

A significant feature of the invention is the way in which the box with the absorber plate 36 therein is secured and sealed to the cover assembly. A layer of adhesive-sealant 44 which has the property of flexibility in maintaining its sealing and bonding character throughout variations in temperatures to which the solar collector is subjected is applied to the top edges of the side and end walls 28 and 30 around the entire box and the cover 18 is then pressed against this layer. Such adhesive-sealants are commercially available and are characterized in the trade as high temperature silicone sealants rated at say minus 50° to plus 450° F. (minus 46° to 232° C.) and can be obtained commercially as the Dow Corning #8641 sealant. The property of flexibility of the adhesive-sealant is important in that the differential expansion between the box 16 and the cover 18 may be in the order of ⅛ of an inch (0.00317m) over a collector length of 8 feet (2.438m) with a 100° F. (38° C.) temperature rise.

In a variation of my invention, a single unbroken cover 48 (FIG. 4) of double width so as to span three successive rafters has two air boxes 16 adhered and sealed thereto, with the two boxes being on opposite sides of the middle rafter. Such an arrangement eliminates a joint and promotes mechanical support.

In operation, the solar collector functions in the conventional manner with the solar radiation being received by the absorber plate 36 which also serves as a heat exchanger with the air which flows through the passageway 38 between the plate and the bottom 26 of the box, the air being returned from the building passing into the collector through the duct 32 and leaving at the opposite end through the duct 34. Depending upon the number and arrangement of solar collectors, the inlet and outlet ducts may be connected in a manifolding arrangement to main ducts running to the spaces to be served.

In my work with a collector of the type described, I have found a satisfactory temperature rise of the air in its passage from one end of the other of the collector. It is my view that probably the salient advantages of a collector according to my invention as contrasted with the typical prior art collector are that it is extremely light-weight and of relatively low cost. For example, 2 feet × 8 feet collector with a copper absorber plate, 1 inch (0.0254m) thick "ductboard" and a sandwich cover plate of reinforced plastic panels weighs in the neighborhood of only 20 lbs. versus the typical 100 lbs. plus of the prior art devices. Besides the other advantages already noted as being available from the light weight of the collector, since it can be integrated into the building structure to serve as an exterior surface area of the building, the weight of the usual building construction materials ia avoided and the relatively light weight of the collector results in a reduced roof load. Since a significant factor in the reduced weight is the omission of a heavy metal frame, the adhesive-sealant is adequate to support the box from the cover with the box not only serving as its own frame but also providing the required thermal insulation.

I claim:

1. A flat-plate solar air collector adapted for installation in cooperative relation with a building frame construction in which the adjacent framing members for an exterior surface of the building are spaced from each other a given distance, said collector comprising:

a rigid frame member made of a relatively low density thermal insulation material and formed into the shape of a shallow channel having opposite side flanges and a bottom web, said insulation material being the only material present in and forming the finished frame member;

solar insolation absorbing plate means in said frame member and located to define with said web an air flow passage therebetween for the flow of air from one end to the other of the collector;

flat transparent glazing cover means covering the open side of said frame member;

adhesive-sealant means securing said cover means to the edges of said opposite flanges, said adhesive-sealant means having the property of flexibility to permit differential expansion and contraction between said frame member and said cover means without the loss of adherence and sealing and being the sole means for supporting said frame member from said cover means;

said frame member having an outside width generally corresponding to said given distance between said framing members and said cover means having a width generally corresponding to the center-to-center distance of adjacent framing member so that, in the installed position of said collector, said frame nests between said framing members with the projecting margial edge portions of said cover means being supported by the outer surfaces of said framing members;

gasket means between the marginal edge portions of said cover means to said framing members;

whereby an area of the exterior surface of the building is formed by the collector alone, and the framing members and the collector serve to stiffen and support each other in a complementary relationship.

2. A collector according to claim 1 wherein said absorbing plate means is of generally corrugated shape in transverse cross section for an increased surface area and resistance to bending relative to a planar plate.

3. A flat-plate solar air collector adapted for installation in cooperative relation with a building frame construction in which the adjacent framing members for an exterior surface of the building are spaced from each other a given distance, said collector comprising:

a frame member having the general form of an upwardly open box with a bottom and at least opposite side walls and formed of relatively low density, rigid, thermal insulating slabs, said insulation material being the only material present in and forming the finished frame member;

a flat, transparent glazing cover for closing the top open side of said box;

a high temperature adhesive and sealant for securing and forming a seal between the facing edges of the walls of the box and the cover, said adhesive-sealant having the property of flexibility in its capability of maintaining its sealing and bonding character through the variations in temperature to which the solar collector is subjected, to accommodate the differential expansion of the box relative to the cover and being the sole means for supporting said frame member from said cover;

solar insolation absorbing plate means in said box and located to define with the bottom of said box an air flow passage therebetween for the flow of air from one end to the other through the box;

said box having an outside width corresponding to said given distance between said framing members, and said cover having a width in excess of said given distance so that, in the installed position of the collector, said frame nests between said framing members with the projecting marginal edge portions of said cover being supported by said framing members;

gasket means adapted for interposition between the marginal edge portion of said cover and said framing members;

whereby an area of the exterior surface of the building is adapted to be formed by the collector alone with the collector forming an integral part of the building structure.

4. A collector according to claim 3 wherein:
said cover comprises fiberglass reinforced plastic panel means.

5. A collector according to claim 3 wherein:
said cover comprises a pair of spaced apart fiberglass reinforced plastic sheets including edge means for holding said sheets in spaced relation.

6. A collector according to claim 3 wherein:
said box includes opposite end walls of relatively low density rigid thermal insulating slabs.

* * * * *